Patented May 11, 1937

2,080,360

UNITED STATES PATENT OFFICE 2,080,360

PROCESS FOR THE PRODUCTION OF SULPHUR FROM SULPHUR DIOXIDE

Robert Lepsoe, Trail, British Columbia, Canada, assignor to The Consolidated Mining & Smelting Company of Canada, Limited, Montreal, Quebec, Canada, a company of Canada No Drawing. Application January 13, 1936, Serial No. 58,987

12 Claims. (Cl. 23—226)

This invention relates to a process for the production of substantially pure sulphur from sulphur dioxide which has been reduced by means of carbon and is particularly directed towards the removal of impurities such as dust, fine particles of carbon, ash and the like, which impurities would otherwise condense with the sulphur thereby rendering it impure.

In the reduction of sulphur dioxide to elemental sulphur by means of carbon the gases from the carbon furnace contain a certain amount of impurities such as dust, finely divided particles of carbon, ash and the like which may be entrained or otherwise collected by the gases during their passage through the various steps of the process. Part of these impurities may be separated from the gases by such known means as dust collectors, cyclone separators and electrostatic precipitation. Heretofore, however, it has not been possible to effect a complete cleansing of the gases at a temperature above the condensation point of the sulphur and, as a result, most of the impurities condense with the sulphur thereby rendering it impure. A further result of these impurities is that the catalyst, utilized to expedite and bring to completion the final gas reactions, becomes clogged and inefficient necessitating replacement at regular intervals.

The principal feature of my invention lies in the manner in which the impurities may be completely separated from the gases, preferably prior to the final gas reaction which results in the complete reduction to elemental sulphur, to result in the condensation of elemental sulphur substantially free from all impurities.

The physico-chemical conditions in the reduction of sulphur dioxide by means of carbon may be briefly outlined in the following manner. In the reducing fuel bed, the exothermic reaction (1)

$$SO_2 + C \rightleftharpoons CO_2 + \tfrac{1}{2}S_2 \qquad (1)$$

takes place in the reduction zone which occurs in the lower part of the furnace. Following reaction (1) but proceeding more slowly, the endothermic reaction (2) reduces $CO_2$ to $CO$ by means of carbon, according to the following equation, in the same zone.

$$CO_2 + C \rightleftharpoons 2CO \qquad (2)$$

The heat absorbed per mol. of $CO_2$ reduced in (2) is greater than the heat given out per mol. $SO_2$ reduced in (1), but since the rate of (1) is about fifteen times faster than that of (2), it is not until about 80% of the $SO_2$ has been reduced that the temperature, produced by the resultant heat of reaction of these reactions, reaches a peak at about 1300° C. well up in the reduction zone. After the gases have moved further upwards and their temperature has fallen to about 1000° C. they enter the top zone and since reactions (1) and (2) become extremely slow at temperatures below 900° C. there will be practically no further reduction in the range from 1000° C. to 700° C. in the top zone.

Under these conditions I have found a further reaction commences in the top zone, the carbon monoxide, formed in the reduction zone, reacting with the sulphur vapor to form carbon oxysulphide gas, as shown in the following reaction:—

$$CO + \tfrac{1}{2}S_2 \rightleftharpoons COS \qquad (3)$$

I make use of this reaction to convert substantially all the convertible sulphur formed by the sulphur dioxide-carbon reaction into gaseous carbon oxysulphide in which form, when the gas is cooled, I can subsequently effect the substantially complete separation of the impurities from the gas by any of the known means.

The clean carbon oxysulphide containing gas is then mixed with an adequate amount of clean sulphur dioxide containing gas, preferably preheated, and subjected to catalysis to effect the following reaction:—

$$2COS + SO_2 \rightleftharpoons 2CO_2 + 3/2 S_2 \qquad (4)$$

This added sulphur dioxide also serves to react with any carbon monoxide, should it accompany the carbon oxysulphide, according to the reaction:—

$$2CO + SO_2 \rightleftharpoons 2CO_2 + \tfrac{1}{2}S_2$$

Calculations based on known thermodynamic constants show that a lowering of the temperature will force these equilibria in the direction of sulphur formation and practically to completion at temperatures at which sulphur condenses. Under these conditions, however, the process would become commercially impracticable on account of the long time required for reaction. Therefore it is necessary to use a catalyst to accelerate these reactions in order to use as low a temperature as possible. As catalysts for these reactions aluminum hydrate or partially hydrated bauxite may be used or, preferably, the catalyst described in my co-pending application Serial No. 7,836.

In accordance with my invention I may introduce sulphur dioxide into the base of a carbonaceous fuel bed such as incandescent coke. The reactions between the carbon and the sulphur dioxide may be established at 1000° C. rising to about 1200° C. a little higher in the fuel bed as may be expressed as follows:

$$SO_2 + C \rightleftharpoons CO_2 + \tfrac{1}{2}S_2 \quad (1)$$

$$CO_2 + C \rightleftharpoons 2CO \quad (2)$$

In the upper part of the fuel bed the temperature is permitted to drop, either through heat exchange with the incoming fresh fuel or by other means, to say from 1000° C. to 700° C. during which the sulphur vapor combines with carbon monoxide to form carbon oxysulphide, as expressed in the following equation:

$$CO + \tfrac{1}{2}S_2 \rightleftharpoons COS \quad (3)$$

Still higher in the furnace, or in a chamber outside the furnace, which chamber may be filled with a suitable catalyst if desired, the gas is still further cooled and reaction (3) continues to combine a further amount of the original sulphur with carbon monoxide.

It is not always practicable to force the reaction to equilibrium since the attainment of this depends on reaction velocity and therefore the amount of sulphur that is convertible is governed by economic conditions determined by the time of retention and the operating temperature.

In order to convert all the primarily formed sulphur to carbon oxysulphide, carbon monoxide may be admitted from any extraneous source such as an auxiliary gas producer. A more economical method is to carry the sulphur dioxide-carbon reduction far enough to form a sufficient amount of carbon monoxide. This can be effected by admitting a controlled amount of an oxidizing gas such as air, oxygenated air or pure oxygen, to the top part of the reduction zone where the temperature is already declining, the object being to provide sufficient heat to effect the endothermic reaction—

$$CO_2 + C \rightleftharpoons 2CO$$

In effecting this reaction I prefer to admit the oxygen bearing gas through one or more rows of inlet ports or tuyères in order to avoid excessively high temperatures which would produce stickiness or clinkering. I have also found that instead of using an oxidizing gas, carbon dioxide containing gas, such as the exit gas from the process, preheated by extraneous means if necessary, may be admitted and will serve the same purpose.

A further feature of my process is that ordinary clean smelter gas, such as the type now being used for sulphuric acid manufacture, can be used to furnish the necessary sulphur dioxide for the carbon oxysulphide-sulphur dioxide catalysis, provided it is substantially free from oxygen. In this case only a part of the total sulphur dioxide to be treated is concentrated to 100% sulphur dioxide by absorption and liberation, the remainder being used direct as secondary sulphur dioxide to the catalysis as above described.

While my process is adapted to the reduction of sulphur dioxide from any source whatsoever, it is applicable to the treatment of sulphur bearing gases resulting from passing sulphur dioxide through a reducing fuel bed when such gases would carry arsenical or antimonial impurities or other metals, metalloids or their compounds which would be volatile at the temperatures concerned. These impurities might originate in arsenic bearing cokes or in ores such as pyrites which frequently contain such impurities. In the operation of my process after the reaction resulting in the formation of carbon oxysulphide, these impurities are separated as sulphides after cooling the gas stream below the temperature at which these impurities will not be present to any appreciable extent in the vapor state and therefore they do not contaminate the sulphur produced in the subsequent steps of the process.

It may be stated also that under certain conditions in the operation of my process it may not be possible to complete the reaction $CO + \tfrac{1}{2}S_2 = COS$ in the reduction furnace. Under these conditions a chamber filled with refractory material may be provided subsequent to the reduction furnace.

It will be clearly understood, of course, that variations in the preferred embodiment of my invention hereinbefore described may be made without departing from the scope thereof.

Having thus fully described my invention, what I claim as new and desire to secure by Letters Patent is:

1. A process for the production of substantially pure sulphur from sulphur dioxide which comprises introducing sulphur dioxide into a carbonaceous fuel bed to form a gas mixture containing carbon monoxide and sulphur, subjecting the gas mixture to such conditions that substantially all the convertible sulphur combines to form carbon oxysulphide, cooling the gas below the condensation point of sulphur, separating the solid and condensed impurities from the carbon oxysulphide, adding clean sulphur dioxide bearing gas to convert carbon oxysulphide to sulphur and carbon dioxide and condensing substantially pure sulphur therefrom.

2. A process for the production of substantially pure sulphur from sulphur dioxide which comprises introducing sulphur dioxide into a carbonaceous fuel bed to form a gas mixture containing carbon monoxide and sulphur, controlling the temperature of the gas mixture to convert substantially all the convertible sulphur to carbon oxysulphide, cooling the gas below the condensation point of sulphur, separating the solid and condensed impurities from the carbon oxysulphide, adding clean sulphur dioxide bearing gas to convert carbon oxysulphide to sulphur and carbon dioxide and condensing substantially pure sulphur therefrom.

3. A process for the production of substantially pure sulphur from sulphur dioxide which comprises introducing sulphur dioxide into a carbonaceous fuel bed to form a gas mixture containing carbon monoxide and sulphur, controlling the temperature of the gas mixture to convert substantially all the convertible sulphur to carbon oxysulphide, cooling the gas below the condensation point of sulphur, separating the solid and condensed impurities from the carbon oxysulphide, adding clean sulphur dioxide bearing gas to convert carbon oxysulphide to sulphur and carbon dioxide, subjecting the resulting gas mixture to catalysis, thereby expediting the production of sulphur, and condensing substantially pure sulphur therefrom.

4. In a process for the production of substantially pure sulphur from sulphur dioxide, which comprises introducing sulphur dioxide into a carbonaceous fuel fed to form a gas mixture containing carbon monoxide and sulphur, the method of subjecting the gas mixture to such conditions that substantially all the convertible sulphur combines to form carbon oxysulphide, cooling the bas below the condensation point of sulphur, separating the solid and condensed impurities therefrom and adding clean sulphur dioxide bearing gas to convert carbon oxysulphide to sulphur and carbon dioxide and condensing substantially pure sulphur therefrom.

5. A process for the production of substantially pure sulphur from sulphur dioxide which comprises introducing sulphur dioxide into a carbonaceous fuel bed to form a gas mixture containing carbon monoxide and sulphur, controlling the temperature of the gas mixture to convert substantially all the convertible sulphur to carbon oxysulphide, cooling the gas below the condensation point of sulphur, separating the solid and condensed impurities from the carbon oxysulphide, adding clean sulphur dioxide bearing gas to convert carbon oxysulphide to sulphur and carbon dioxide, preheating the gas mixture and subjecting it to catalysis, thereby expediting the production of sulphur, and condensing substantially pure sulphur therefrom.

6. A process for the production of substantially pure sulphur from sulphur dioxide which comprises introducing sulphur dioxide into a carbonaceous fuel bed to form a gas mixture containing carbon monoxide and sulphur, submitting the gas mixture to such conditions that substantially all the convertible sulphur combines to form carbon oxysulphide, cooling the carbon oxysulphide below the condensation point of sulphur and effecting a substantially complete separation of the solid and condensed impurities therefrom, adding clean sulphur dioxide bearing gas to convert carbon oxysulphide to sulphur and carbon dioxide, preheating the resulting gas mixture and subjecting it to catalysis to expedite the formation of a gas containing carbon dioxide and sulphur vapor and condensing substantially pure sulphur therefrom.

7. A process for the production of substantially pure sulphur from sulphur dioxide which comprises introducing sulphur dioxide into a carbonaceous fuel bed to form a gas mixture containing carbon monoxide and sulphur, admitting sufficient amounts of an oxydizing gas into the upper part of the fuel bed to form an excess of carbon monoxide over that required to combine with the sulphur to form carbon oxysulphide, subjecting the gas mixture to such conditions that substantially all the convertible sulphur combines to form carbon oxysulphide, cooling the carbon oxysulphide below the condensation point of sulphur and effecting a substantially complete separation of solid and condensed impurities therefrom, adding clean sulphur dioxide bearing gas to convert carbon oxysulphide to sulphur and carbon dioxide and condensing substantially pure sulphur therefrom.

8. A process for the production of substantially pure sulphur from sulphur dioxide which comprises introducing sulphur dioxide into a carbonaceous fuel bed to form a gas mixture containing carbon monoxide and sulphur, admitting sufficient amounts of an oxydizing gas into the upper part of said fuel bed to form an excess of carbon monoxide over that required to combine with the sulphur to form carbon oxysulphide, subjecting the gas mixture to such conditions that substantially all the convertible sulphur combines to form carbon oxysulphide, cooling the carbon oxysulphide below the condensation point of sulphur and effecting a substantially complete separation of solid and condensed impurities therefrom, adding clean sulphur dioxide bearing gas to convert carbon oxysulphide to sulphur and carbon dioxide, preheating the gas mixture and subjecting it to catalysis to expedite the formation of a gas containing carbon dioxide and sulphur vapor and condensing substantially pure sulphur therefrom.

9. A process for the production of substantially pure sulphur from sulphur dioxide which comprises introducing sulphur dioxide into a carbonaceous fuel bed to form a gas mixture containing carbon monoxide and sulphur, subjecting the gas mixture to such conditions that substantially all the convertible sulphur combines to form carbon oxysulphide, cooling the carbon oxysulphide below the condensation point of sulphur and effecting a substantially complete separation of solid and condensed impurities therefrom, adding clean sulphur dioxide bearing smelter gas to convert carbon oxysulphide to sulphur and carbon dioxide, preheating the gas mixture and subjecting it to catalysis to expedite the formation of a gas containing carbon dioxide and sulphur vapor and condensing substantially pure sulphur therefrom.

10. A process for the production of substantially pure sulphur from sulphur dioxide as claimed in claim 6 in which hot carbon dioxide gas from the catalysis step of the process is preheated and returned to the upper part of the fuel bed to form an excess of carbon monoxide.

11. In a process for the production of substantially pure sulphur from sulphur dioxide which comprises introducing sulphur dioxide into a carbonaceous fuel bed to form a gas mixture containing carbon monoxide and sulphur, the method of separating therefrom metallic sulphide forming impurities which comprises subjecting the gas mixture to such conditions that substantially all the convertible sulphur combines to form carbon oxysulphide, cooling the carbon oxysulphide below the condensation point of said metallic impurities, separating the solid and condensed impurities from the carbon oxysulphide, adding clean sulphur dioxide bearing gas to convert carbon oxysulphide to sulphur and carbon dioxide and condensing substantially pure sulphur therefrom.

12. In a process for the production of substantially pure sulphur from sulphur dioxide which comprises introducing sulphur dioxide into a carbonaceous fuel bed to form a gas mixture containing carbon monoxide and sulphur, the method of separating therefrom metallic sulphide forming impurities which comprises subjecting the gas mixture to such conditions that substantially all the convertible sulphur combines to form carbon oxysulphide, cooling the carbon oxysulphide below the condensation point of said metallic impurities, separating the solid and condensed impurities in sulphide form, adding clean sulphur dioxide bearing gas to convert carbon oxysulphide to sulphur and carbon dioxide, subjecting the resulting gas mixture to catalysis to expedite the formation of carbon dioxide and sulphur vapor and condensing substantially pure sulphur therefrom.

ROBERT LEPSOE.